US009973932B2

(12) United States Patent
Barberis et al.

(10) Patent No.: US 9,973,932 B2
(45) Date of Patent: May 15, 2018

(54) SCORE-BASED INTERFERENCE COORDINATION IN WIRELESS COMMUNICATION SYSTEMS

(75) Inventors: Sergio Barberis, Turin (IT); Andrea Buldorini, Turin (IT); Paolo Priotti, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 740 days.

(21) Appl. No.: 13/504,113

(22) PCT Filed: Oct. 26, 2009

(86) PCT No.: PCT/IT2009/000480
§ 371 (c)(1),
(2), (4) Date: Apr. 25, 2012

(87) PCT Pub. No.: WO2011/051980
PCT Pub. Date: May 5, 2011

(65) Prior Publication Data
US 2012/0231742 A1    Sep. 13, 2012

(51) Int. Cl.
*H04W 16/10* (2009.01)
*H04W 72/08* (2009.01)

(52) U.S. Cl.
CPC ............ *H04W 16/10* (2013.01); *H04W 72/08* (2013.01)

(58) Field of Classification Search
CPC ...... H04B 15/00; H04W 16/10; H04W 72/08; H04W 16/14; H04W 28/16; H04W 72/04; H04W 76/02

(Continued)

(56) References Cited

U.S. PATENT DOCUMENTS 5,455,821 A    10/1995    Schaeffer
5,475,868 A    12/1995    Duque-Anton
(Continued)

FOREIGN PATENT DOCUMENTS

EP        0 585 994 A2    3/1994
WO    WO 03/061318 A1    7/2003
(Continued)

OTHER PUBLICATIONS

Combined Chinese Office Action and Search Report dated Mar. 27, 2014 in Patent Application No. 200980162774.1 (with English language translation).

(Continued)

*Primary Examiner* — Nay A Maung
*Assistant Examiner* — Maryam Soltanzadeh
(74) *Attorney, Agent, or Firm* — Oblon, McClelland, Maier & Neustadt, L.L.P.

(57) ABSTRACT

An interference coordination method for a radio communication system includes a plurality of user equipment configured to communicate on radio resources with transceiver stations exchanging between transceiver stations one or more coordination messages concerning interference on an interfered radio resource, and determining a score of a potential allocation of the interfered radio resource to potentially-interfered user equipment based on said coordination message or messages. In particular, the radio resource scheduling method includes generating, for a transceiver station serving respective served user equipment, a set of candidate aggregate allocations including corresponding potential allocations of radio resources to respective served user equipment, performing the interference coordination method to determine a score of each potential allocation in the candidate aggregate allocations, computing a total score of each candidate aggregate allocation based on the scores of (Continued)

the corresponding potential allocations, and allocating radio resources to respective served user equipment based on the total scores of the candidate aggregate allocations.

23 Claims, 1 Drawing Sheet

(58) Field of Classification Search
 USPC .................................................... 455/63.1
 See application file for complete search history.

(56) References Cited

U.S. PATENT DOCUMENTS

| | | | | |
|---|---|---|---|---|
| 5,666,655 | A * | 9/1997 | Ishikawa et al. | 455/512 |
| 5,963,584 | A | 10/1999 | Boulanger | |
| 6,223,041 | B1 | 4/2001 | Egner et al. | |
| 2007/0280175 | A1 * | 12/2007 | Cheng | H04B 7/022 370/338 |
| 2008/0293423 | A1 * | 11/2008 | Park | H04W 24/10 455/450 |
| 2009/0061842 | A1 | 3/2009 | Park et al. | |
| 2009/0296635 | A1 * | 12/2009 | Hui | H04W 48/10 370/328 |
| 2010/0029282 | A1 | 2/2010 | Stamoulis et al. | |
| 2010/0128618 | A1 | 5/2010 | Simonsson et al. | |
| 2011/0130098 | A1 * | 6/2011 | Madan | H04W 24/02 455/63.1 |

FOREIGN PATENT DOCUMENTS

| | | |
|---|---|---|
| WO | WO 2008/095543 A1 | 8/2008 |
| WO | WO 2008/096383 A1 | 8/2008 |
| WO | WO 2008/130297 A1 | 10/2008 |
| WO | WO 2011/051981 A1 | 5/2011 |

OTHER PUBLICATIONS

International Search Report from the European Patent Office for International Application No. PCT/EP2009/000480, mailing date Jul. 23, 2010.

* cited by examiner

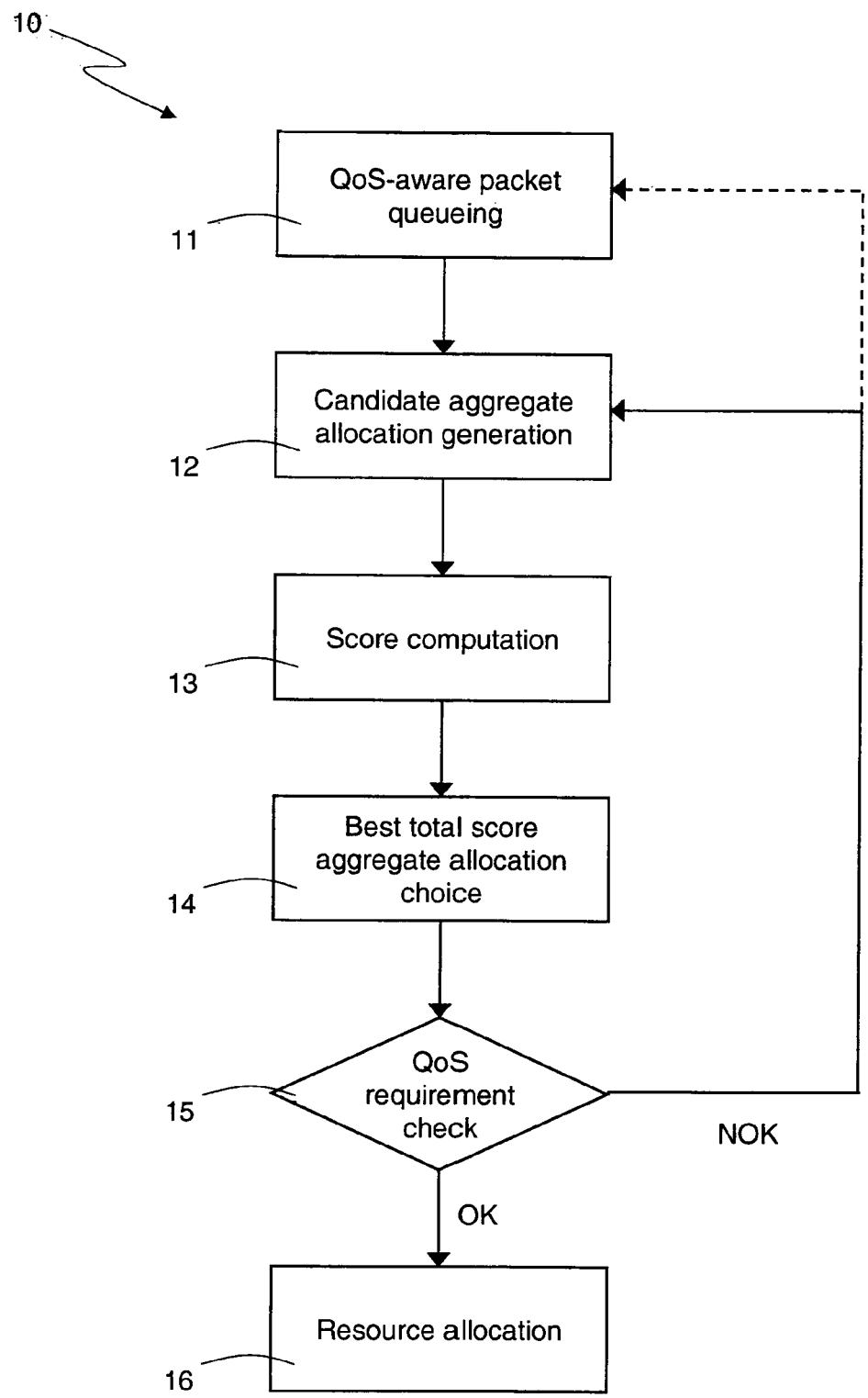

SCORE-BASED INTERFERENCE COORDINATION IN WIRELESS COMMUNICATION SYSTEMS

CROSS REFERENCE TO RELATED APPLICATION

This application is a national phase application based on PCT/IT2009/000480, filed Oct. 26, 2009, the content of which is incorporated herein by reference.

TECHNICAL FIELD OF THE INVENTION

The present invention relates in general to wireless communication systems, and more specifically to intra-system interference coordination in cellular and non-cellular radio communication systems.

In particular, cellular radio communication systems where the present invention may find advantageous, but not limitative application, are for example the so-called beyond-3G (3rd Generation) cellular radio communication systems, i.e. new generation cellular radio communication systems having a wider transmission bandwidth than 3G cellular radio communication systems, such as for example those known as Third Generation Partnership Project Long Term Evolution (3GPP LTE) cellular radio communication systems.

Non-cellular radio communication systems where the present invention may find advantageous, but not limitative application are for example Wireless Local Area Networks (WLANs), and in particular WiMAX (Worldwide Interoperability for Microwave Access) specified by the WiMAX Forum, formed to promote conformance and interoperability of the IEEE 802.16 standard, officially known as WirelessMAN, and which is described by the Forum as "a standard-based technology enabling the delivery of last mile wireless broadband access as an alternative to cable and DSL".

BACKGROUND ART

Cellular phone systems and portable/mobile user equipments/terminals based on cellular radio communication have evolved in the past years from analogue, narrowband Frequency Division Multiple Access (FDMA) transmission ($1^{st}$ generation (1G) cellular radio communication systems), first to digital, narrowband Frequency and Time Division Multiple Access (FDMA/TDMA) transmission ($2^{nd}$ generation (2G) cellular radio communication systems), and later to digital, broadband Code Division Multiple Access (CDMA) transmission ($3^{rd}$ generation (3G) cellular radio communication systems).

Further evolution, which will include but will be not limited to the adoption of higher data rates, will be based on an improvement of spectral efficiency of transmission systems. However, given the limits of reasonably achievable spectral efficiency, an increase in transmission bandwidth is foreseen for future generations of cellular phone systems.

Accordingly, research is moving towards new generation cellular radio communication systems having a wider transmission bandwidth than 3G cellular radio communication systems, such as for example those known as 3GPP LTE cellular radio communication systems.

In particular, when transmission bandwidth increases, transceivers typically show an increase in their circuit complexity, depending on the type of modulation and multiplexing used. For instance, 3G cellular radio communication systems based on CDMA operate effectively on bandwidths up to several MHz, 10 MHz being often considered an upper limit for the bandwidth of low-cost commercial CDMA equipments using a RAKE receiver or other Single Carrier (SC) receivers with a time-domain equalizer.

When the bandwidth of the transmission systems becomes larger than a few MHz (about 10 MHz), a multi-carrier modulation is often more suitable to keep the transceivers circuit complexity as low as possible.

In particular, Orthogonal Frequency Division Multiplexing (OFDM) has proved to be particularly suited to use with cost-efficient transceivers that process signals in the frequency domain both on the transmitting and receiving sides. More in detail, OFDM is based upon the principle of Frequency Division Multiplexing (FDM), but is implemented as a digital modulation scheme.

Specifically, the bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross-talk between the sub-channels is eliminated. This orthogonality occurs when sub-carriers are equally spaced by the symbol rate of a sub-carrier. OFDM exploits frequency spectrum in a particularly efficient way, thanks to the fact that sub-carriers do not interfere reciprocally even if they have partially overlapping spectra. OFDM also allows to largely simplify Multi-Input-Multi-Output (MIMO) receivers compared to SC systems, MIMO receivers being needed as one of fundamental elements to increase the spectral efficiency.

Moreover, in OFDM, transition from frequency to time domain, and vice versa, is typically performed with relatively low-complexity Inverse Fast Fourier Transform (IFFT) and Fast Fourier Transform (FFT) circuits.

The primary advantage of OFDM is its capability to cope with severe channel conditions—for example, multi-path and narrowband interference—without complex equalization filters. Channel equalization is simplified by using many slowly modulated narrowband signals instead of one rapidly modulated wideband signal. 3GPP LTE cellular radio communication systems adopt an OFDM-based physical layer. In particular, 3GPP LTE cellular radio communication systems will have an OFDM-based downlink and a SC-FDMA-based uplink.

Outside the cellular radio communication systems, transceivers have evolved earlier towards large bandwidths. For example WLANs complying with the IEEE802.11 standard family use a 20 MHz channel, and transmit with a 64-sub-carrier OFDM modulation. More specifically, in WLANs, transmission is governed by a Medium Access Control (MAC) protocol, called Carrier Sense Multiple Access with Collision Avoidance (CSMA-CA), that avoids transmission when a given frequency channel is already in use. For this reason, inside a given WLAN cell, there is usually no direct co-channel interference between different transceivers. Moreover, in a hot-spot kind of territory coverage, WLAN cells are usually physically separated, so that other-cell interference is largely limited in most cases.

However, in 3GPP LTE cellular radio communication systems, OFDM is expected to work in a very different environment compared to WLANs. In fact, in a cellular radio communication system, where a continuous radio coverage is required, the signal transmitted by a transceiver station in downlink (DL) or by a terminal or User Equipment (UE) in uplink (UL) can overlap the service area of neighbouring cells. Demands for high spectral efficiency, on the other hand, practically prevent the adoption of high frequency reuse like in 2G cellular radio communication systems, so that it is expected that for example in 3GPP LTE cellular radio communication systems the frequency reuse factor will be low, if not unitary. In 3GPP LTE cellular radio communication systems it is likely that especially at the cell edge very strong co-channel, intra-system interference will be present, substantially lowering user throughput, if not properly mitigated.

An equivalent interference scenario, but in TDD, could arise e.g. in IEEE802.16 and IEEE802.20 networks and similar.

Inter-cell interference can be mitigated by using for example Radio Resource Management (RRM) mechanisms (i.e. interference coordination) or layer-1 mechanisms, such as spatial suppression by means of multiple antennas and cancellation based on detection/subtraction of the inter-cell interference. A classification of these mechanisms can be found for example in 3GPP TR 25.814 "Physical layer aspect for evolved Universal Terrestrial Radio Access (UTRA)" sec. 7.1.2.6.

OBJECT AND SUMMARY OF THE INVENTION

The Applicant has noted that while in CDMA-based radio interfaces there is an intrinsic protection against inter-cell, intra-system interference, in LTE no direct protection embedded in the radio interface exists. Moreover, network architecture in LTE has been simplified in comparison with 3G, in that there is no RNC (Radio Network Controller), and many of the centralised functions which had been implemented in RNC have been de-centralized (distributed) in the Node Bs (identified in LTE as "evolved-Node Bs" or "e-Node Bs"). Also RRM is included among those functions. As such, it is not expected to have in LTE a centralized control of interference coordination.

Therefore, the Applicant feels the need to provide an efficient interference coordination policy.

In fact, evolution of wireless communication systems, both cellular and non-cellular, is moving towards wider transmission bandwidth in order to provide higher bit rates. Consequently interference in adjacent radio cells might increase thus resulting in the necessity of an efficient Inter-Cell Interference Coordination (ICIC) method which allows to mitigate the interference.

The objective of the present invention is then to provide an interference coordination methodology which can alleviate at least some of the above cited drawbacks, and in particular which allows to mitigate intra-system interference.

This objective is achieved by the present invention in that it relates to a method for coordinating interference in a radio communication system, a method for scheduling radio resources in a radio communication system, a first system and a first computer program configured to implement said method for coordinating interference, a second system and a second computer program configured to implement said method for scheduling radio resources, a first computer program product comprising a first computer-readable medium having such a first computer program stored therein, a first network apparatus for use in a Node B and/or in a e-Node B and storing such a first computer program, a second computer program product comprising a second computer-readable medium having such a second computer program stored therein, and a second network apparatus for use in a Node B and/or in a e-Node B and storing such a second computer program, as defined in the appended claims.

The present invention achieves the aforementioned objective by an interference coordination method for implementing a coordination of intra-system interference experienced in a radio communication system including a plurality of user equipments configured to communicate on radio resources with transceiver stations, the interference coordination method comprising:

exchanging between transceiver stations one or more coordination message(s) concerning interference on an interfered radio resource; and determining a score of a potential allocation of said interfered radio resource to a potentially-interfered user equipment based on said coordination message(s).

In particular, determining a score can comprise:

determining a first quantity indicative of a transmission capacity associated with said potential allocation; and determining said score further based on said first quantity.

Furthermore, another aspect of the present invention is related to a radio resource scheduling method which is based on the interference coordination method.

In particular, the radio resource scheduling method comprises:

generating, for a transceiver station serving respective served user equipments, a set of candidate aggregate allocations, each candidate aggregate allocation comprising corresponding potential allocations of radio resources to respective served user equipments;

performing the interference coordination method to determine a score of each potential allocation in said candidate aggregate allocations;

computing a total score of each candidate aggregate allocation based on the scores of the corresponding potential allocations; and allocating radio resources to respective served user equipments based on the total scores of said candidate aggregate allocations.

BRIEF DESCRIPTION OF THE DRAWING

For a better understanding of the present invention, preferred embodiments, which are intended purely by way of example and are not to be construed as limiting, will now be described with reference to the attached FIGURE (not to scale) which shows a flow chart of a radio resource scheduling method according to the present invention.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed.

Thus, the present invention is not intended to be limited to the embodiments shown, but is to be accorded the widest scope consistent with the principles and features disclosed herein and defined in the appended description and claims.

Moreover, the present invention is implemented by means of a software program, loadable in a memory of an electronic processor, and comprising software code portions for implementing, when the software program is run on the electronic processor, the interference coordination method and/or the scheduling method described hereinafter.

Additionally, in the following, without losing generality, specific reference will be made to a 3GPP LTE cellular radio communication system, remaining clear that the present invention can also be applied to other type of cellular or non-cellular systems such as WiMAX or WLANs. For this reason, when referring to a transceiver station being part of the network infrastructure, the terminology "evolved-Node B" (e-Node B), that is the terminology commonly adopted in 3GPP LTE cellular radio communication systems, will be used.

The Applicant has carried out an in-depth study in order to investigate the possibility to develop an efficient Inter-Cell Interference Coordination (ICIC) method. During this in-depth study the Applicant has noted that inter-cell interference can be avoided or mitigated by radio resource management (RRM) mechanisms which go downwards in the protocol stack to radio resource scheduling.

Therefore, according to the present invention, an intra-system interference coordination method, in particular an ICIC method, which stems from this in-depth study, is presented.

In general, the present invention applies to wireless communication systems wherein radio interface between base stations, such as e-node Bs, and mobile stations, such as User Equipments (UEs), is based on a physical layer with multi-carrier transmission, and sensitive to inter-cell interference.

In the following, in the wireless communication system under consideration, an assumption is made that a downlink of a 3GPP Evolved-UMTS terrestrial Radio Access Network (E-UTRAN) LTE system is adopted, remaining clear that the present invention is applicable to other cellular and non-cellular systems based on OFDM or other multi-carrier transmission.

In particular, for sake of simplicity, in the following the present invention will be described making explicit reference to downlink case, remaining clear that a similar method can be applied to uplink case.

Moreover, another assumption is made that the 3GPP E-UTRAN LTE system uses a given frequency band wherein each e-Node B can allocate resources to users with a granularity of one Physical Resource Block (PRB) in the frequency domain, i.e., a PRB being the minimum allocation unit for a scheduler of a e-Node B, and one Transmission Time Interval (TTI) in the time domain, one TTI being made up of a number of consecutive OFDM symbols and having a fixed length. However the present invention is also applicable in case of variable-length TTIs. In the 3GPP E-UTRAN LTE system under consideration it is not possible to allocate one PRB to a certain user for a time shorter than a TTI. However the present invention is applicable also to systems wherein resource allocation has a finer resolution in time dimension.

Furthermore, in the following, always without loosing generality, only concentrated PRBs, which are continuous sets of adjacent sub-carriers, and have fixed dimension in the frequency domain, i.e., a constant number of sub-carriers per PRB, will be considered.

Finally, a further assumption is made that a characterization of inter-cell interference is performed by e-Node Bs in the 3GPP E-UTRAN LTE system under consideration, and that each UE in the 3GPP E-UTRAN LTE system under consideration periodically sends via uplink signalling to a respective serving e-Node B values of Channel Quality Indicator (CQI) for those PRBs which have currently the highest transmission channel quality for the UE.

An example of characterization of downlink interference is disclosed in Applicant's international patent application PCT/EP2007/051302 filed on Sep. 2, 2007 and having title "Characterization of co-channel interference in a wireless communication system", while an example of characterization of uplink interference is disclosed in Applicant's international patent application PCT/IT2007/000695 filed on Mar. 10, 2007 and having title "Characterization of uplink co-channel interference in a wireless communication system, in particular a cellular radio communication system". Those documents teach how to bring knowledge to the transmitting elements in a network about who generates interference they are experiencing. The whole process is carried out with a very low additional hardware complexity in handheld terminals. Moreover, signalling overhead on radio interface is minimal, and equally very limited network signalling is required on X2 interface, which is a network interface provided in the 3GPP LTE for allowing direct communications between e-Node Bs (see 3GPP Technical Specification (TS) 36.300).

In brief, according to the above referenced Applicant's international patent applications, UEs in the 3GPP E-UTRAN LTE system under consideration provide respective serving e-Node Bs with information necessary to reconstruct interference scenario of respective serving cells.

In particular, it is assumed that with a certain time periodicity every e-Node B transmits a cell-specific pilot signals sequence:

$$T_i = \{\theta_1, \ldots, \theta_\tau\} \quad (1)$$

where $\tau$ is the sequence length.

Additionally, it is also assumed that for a given considered UE there are Q interfering e-Node Bs, i.e., those e-Node Bs which use the same set or subset of PRBs of the e-Node B serving the considered UE and which can be considered as the potential main interferers for that UE.

In particular, the main interfering e-node Bs comprise both disturbing or disturbed e-Node Bs in relation with the serving e-Node B under consideration. In a simple and ideal network with hexagonal cells (or sectors), the main interfering e-node Bs are usually a subset of the first or first-and-second tiers of e-Node Bs. More difficult is definition of main interferers in a network with complicated topology, and should be based on case-by-case measurements.

Moreover, it is also assumed that the considered UE has knowledge of the Q pilot signals sequences of those main interfering e-Node Bs. The UE will then be able to periodically measure the received power for each of the Q known pilot signals sequences.

The quantities measured by the UE take the form:

$$\varphi_{nk} = \{p_1, \ldots, p_Q\} \quad (2)$$

where n is a time instant and k is an index identifying the UE. Moreover, let us assume that the measured powers are actually average powers over a given time duration which can coincide with a cycle time of ICIC (Inter-Cell Interference Coordination) or can be a fraction of the same.

Supposing that all e-Node Bs transmit the same pilot signal power, the vector of measured powers is inversely proportional to the long-term average attenuation experienced by the pilot signal of each interferer. In decibel, inversion becomes a change of sign:

$$A_{nk} = \{\pi_p + \eta - p_1, \ldots, \pi_p + \eta - p_Q\} = \{a_{k1}^{(n)}, \ldots, a_{kQ}^{(n)}\} \quad (3)$$

where $A_{nk}$ is the attenuation vector, $\pi_p$ represents pilot signal power at the transmit antenna, $\eta$ is an optional term used for power normalization in the system, which might also take into account a possible power control mechanism on the pilot signal.

The k-th UE periodically feedbacks the attenuation vector $A_{nk}$ to the serving e-Node B. The serving e-Node B can store the attenuation vector $A_{nk}$ as it is, or can apply to it a vector quantization process as described in the above referenced Applicant's international patent applications.

Each one of the neighboring e-Node Bs then signals to the serving e-Node B, via the X2 interface, the vector:

$$\underline{P}_i = \{\pi_{i1}, \ldots, \pi_{iN}\} \qquad (4)$$

where i is an index identifying the neighboring e-Node B, N is the total number of PRBs, and $\pi_{ij}$ is the power that the i-th e-Node B transmits on the j-th PRB. Depending on signalling conventions, value $\pi_{ij}=0$ could be used to indicate that the i-th e-Node B does not use the j-th PRB. $\pi_{ij}$ can be also a quantized version of the transmitted power.

These signalling aspects belong to the same category of the inter-e-Node B signalling for ICIC purpose defined in 3GPP TS 36.423—Evolved Universal Terrestrial Radio Access Network (E-UTRAN); X2 Application Protocol (X2AP).

For each time instant n, interference power sustained by the k-th UE in the m-th PRB can be estimated by the serving e-Node B as (in logarithmic units):

$$\sigma_{km} = 10\log_{10}\sum_{i=1}^{Q} 10^{\frac{\pi_{im}-a_{ki}}{10}} \qquad (5)$$

where time-dependency (index n) has been intentionally dropped in all the terms. The equation (5) is correct because the long-term attenuation does not depend on fast fading and is substantially constant over the whole bandwidth.

It is also possible to compute contributions to the interference power per PRB specific for a given interfering e-Node B. In fact, the interference power sustained by the k-th user equipment in the m-th PRB and originated by the i-th e-Node B can be estimated by the serving e-Node B as (in logarithmic units):

$$s_{kmi} = \pi_{im} - a_{ki}, 1 \leq i \leq Q.$$

If a total number of UEs served by the serving e-Node B is U, an interference load of the m-th PRB can be defined as:

$$\lambda_m = \sum_{k=1}^{U} \sigma_{km} \cdot \delta_{km} \qquad (6)$$

where $\delta_{km}$ is an activity factor of the k-th UE in the m-th PRB, relative to the last ICIC period. The activity factor $\delta_{km}$ is known to the serving e-Node B and is normalized between 0 and 1. A null value means that the UE does not use the specified PRB.

Moreover, in the 3GPP E-UTRAN LTE system under consideration it is further assumed that the e-Node Bs exchange coordination messages.

In general, the coordination messages are optional messages transmitted by an e-Node B on the X2 interface to the main interfering e-Node Bs, and have the conventional meaning that the source e-Node B has an intention to use a specified PRB in the following ICIC period. As explained in the literature, coordination messages can have in practice many different meanings, depending on the implemented ICIC method. However, they can be interpreted in general as the indication that one PRB, which is particularly critical from the point of view of inter-cell interference, will bear, in the following ICIC period, a certain additional interference power originated by the source e-Node B.

The ICIC method according to the present invention operates in cycles having a periodicity much longer than the duration of OFDM symbols. Conveniently, the duration of one ICIC period may last for tens to hundreds of TTIs.

In particular, a coordination message originated in the i-th e-Node B and terminating in the j-th e-Node B, which is one of the main interfering e-Node Bs of the i-th e-Node B, is indicated as follows:

$$K_{ij}^{\ 1} = \{m, \varphi_m\} \qquad (7)$$

where $\varphi_m$ indicates an additional average power, in comparison with currently transmitted average power, which will be transmitted by the i-th e-Node B on the m-th PRB in the next ICIC period. Index l allows to distinguish a plurality of coordination messages which might be exchanged between the same e-Node Bs in the same ICIC period. However, during one ICIC period, only a maximum of one coordination message per PRB can be transmitted from the i-th e-Node B to the j-th e-Node B, i.e., the maximum value of l is N.

Moreover, it is also assumed that all vectors (4) and all coordination messages (7) are exchanged exactly at the same time instant over X2 network interfaces, just before the start of an ICIC period. In a real implementation the messages can be sent during an ICIC period, provided they can be computed and taken into account for the following ICIC period.

The meaning of equation (7) is only a conventional meaning, because in practice there are a plurality of strategies for deciding to transmit a coordination message.

In particular, a few practical cases in which an e-Node B can decide to transmit a coordination message are hereinafter listed:

1. an e-Node B needs more transmission resources to satisfy overall requests from the respective served UEs, i.e., it plans using one or more PRB(s) that it has not been using so far;

2. an e-Node B needs more transmission power on one PRB to satisfy overall requests from the respective served UEs;

3. an e-Node B demands a decrease of incoming inter-cell interference power on one PRB; and 4. an e-Node B is not satisfied with current allocation of the resources in the neighborhood so decides to try and trigger a re-shuffle of the resources in a subset of the main interfering e-Node Bs.

Messages 1 and 2 are sent by an interfering e-Node B to an interfered e-Node B and are called push messages. Messages 3 and 4 are sent by an interfered e-Node B to an interfering e-Node B and are called pull message.

As a general principle, coordination messages are only generated for highly-interfered resources.

Therefore, preferably, a necessary but not sufficient condition to originate a coordination message $\{m, \varphi\}$ is that:

$$\lambda_m > t_h$$

where $t_h$ is a threshold which depends on the particular radio access network system under consideration.

Summarizing, the ICIC method according to the present invention is applicable to a cellular radio communication system wherein the e-Node Bs exchange the coordination messages.

Preferably, a characterization of inter-cell interference is performed by the e-Node Bs in the cellular radio communication system and the coordination messages are generated by the e-Node Bs based on an inter-cell interference scenario resulting from the performed characterization of inter-cell interference.

Conveniently, the characterization of inter-cell interference may be performed according to teachings of the above referenced Applicant's international patent applications PCT/EP2007/051302 and PCT/IT2007/000695.

Moreover, as previously said, a given coordination message transmitted by a first e-Node B in a first ICIC period indicates that the first e-Node B intends to use in a second ICIC period, which follows the first ICIC period, a given PRB specified in the given coordination message. However, the first e-Node B does not have any strict obligation to actually transmit on the given PRB in the second ICIC period, and, similarly, a second e-Node B which receives the given coordination message does not have any strict obligation to avoid using the given PRB in the second ICIC.

Instead, according to the present invention, the second e-Node B uses the given coordination message to weigh a potential use of the given PRB in the second ICIC.

In particular, the second e-Node B, which is in communication with respective served UEs, computes a score of a potential allocation of the given PRB to a served UE based on the given coordination message and on a CQI (Channel Quality Indicator) of the given PRB sent by the served UE to the second e-Node B.

Generalizing, an interfered e-Node B receiving from interfering e-Node Bs respective coordination messages for a specified PRB computes a score of a potential allocation of the specified PRB to a served UE based on the coordination messages received for the specified PRB and on a CQI of the specified PRB sent by the served UE.

The computed score is indicative of the suitability of the potential allocation in terms of transmission capacity associated with the potential allocation with respect to potential inter-cell interference which would experienced by the served UE in the potential allocation.

In detail, the interfered e-Node B computes a score $\Omega(m,k)$ of a potential allocation of an m-th PRB to a k-th UE as follows:

$$\Omega(m, k) = \beta \cdot f_1[C(m, k)] - \mu \cdot f_2\left[\sum_{l \in \Phi} \phi_m(K_{ij}^l)\right] \qquad (8)$$

where C(m,k) is an estimated transmission capacity associated with the potential allocation of the m-th PRB to the k-th UE, $\Phi$ is a set of values of l that identify coordination messages for the m-th PRB received by the interfered e-Node B, $f_1$ and $f_2$ indicate two optional, generic monotonic, non-linear functions, and $\beta$ and $\mu$ are two positive coefficients that can be modified for network tuning in a first phase, and later can be readjusted by system Operation & Maintenance (O&M) to optimize network throughput depending on traffic conditions, propagation scenario (e.g. microcell or macrocell), Quality of Service (QoS), etc.

The transmission capacity C(m,k) depends on the Signal-to-Noise-plus-Interference Ratio (SNIR) that the k-th UE measures on the m-th PRB, and can be derived from the CQI of the m-th PRB computed by the k-th UE.

In intuitive terms, a score of a given potential allocation PRB-to-UE is a scalar that becomes larger when the given potential allocation brings a high transmission capacity, and becomes smaller if the PRB is critical from inter-cell interference point of view. It does not matter if the interference is outbound or inbound with respect to the considered cell, because the scheduling process does not have a direct view of ICIC policies. The rightmost term in (8) lets every possible ICIC algorithm to interact with the scheduling level. A simplified version of the score does not comprise the two non-linear functions $f_1$ and $f_2$:

$$\Omega(m, k) = \beta \cdot C(m, k) - \mu \cdot \sum_{l \in \Phi} \phi_m(K_{ij}^l) \qquad (8')$$

Additionally, the score-based ICIC mechanism according to the present invention can be integrated in, and exploited by a resource scheduling process, meaning that weights coming from coordination messages enter directly the scheduling process.

In general, in a scheduling process comprising the score-based ICIC mechanism according to the present invention the highest the score, the highest is the probability that the respective potential allocation is actually part of the final allocation decided for the next TTI.

As previously said, the duration of one ICIC cycle lasts for tens to hundreds of TTIs, while a scheduler decides resource allocation every TTI.

The fact that one ICIC cycle is much longer than the scheduling period is very important to correctly understand the relationship between scheduling and ICIC.

In the scores the estimated transmission capacities, i.e., the CQIs, and the quantities specified by coordination messages have very different coherence times.

In fact, CQI values can vary very quickly when in presence of fast fading channels. In other words, coherence time is in the order of one TTI. Instead, the quantities specified by coordination messages remain constant for a whole ICIC period, i.e. tens to hundreds of times longer than one TTI.

The scheduling as a process evolves every TTI, and as such is extremely more rapid than ICIC. However, allocations of users on the transmission resources have a direct effect on interference. Average interference power, in turn, influences ICIC via UE measurements.

In summary, ICIC and scheduling are two mechanisms reciprocally influencing each other.

Therefore, while traditional schedulers (round robin, maximum Carrier-to-Interface (C/I), proportional fair, etc.) are completely free to alter the resource allocations every TTI without considering any ICIC mechanism, according to another aspect of the present invention, hereinafter a scheduler which implements resource scheduling and allocation by taking into account the score-based ICIC mechanism will be presented.

In particular, said scheduler builds up many candidate aggregate allocation sets and among those candidate aggregate allocation sets chooses a final allocation on the basis of the score-based ICIC mechanism. The use of the scores dependent on the coordination messages lets the final allocation converge, on average, to resources that are less interfered and emit less interference towards the main interferers.

Relating to this, the attached FIGURE shows flow chart of an exemplary scheduling method 10 comprising the score-based ICIC mechanism according to the present invention.

In detail, as shown in the attached FIGURE, the scheduling method 10, first of all, comprises:
- a QoS-aware packet queueing (block 11), which, in turn, comprises building up, queues of packets for each UE and, in the most general case, for each service requested by each UE, a time stamp being associated with each packet, and for each packet a corresponding transmission priority being computed depending on the corresponding service and on the corresponding time stamp; and
- a candidate aggregate allocation generation (block 12), which, in turn, comprises generating a set of candidate aggregate allocations, each candidate aggregate allocation being a set of potential allocations (m,k,b) where m is an index identifying a PRB, k is an index identifying a UE the PRB is assigned to in the considered potential allocation, and b is a number of bits carried by the PRB in the considered potential allocation, or, equivalently, the modulation and coding set used for the PRB.

In particular, a candidate aggregate allocation is written as:

$$\Gamma_q = \{(m_1,k_1,b_1)_q, (m_2,k_2,b_2)_q, \ldots, (m_N,k_N,b_N)_q\} \quad (9)$$

where q is an index identifying the candidate aggregate allocation, and where it has been made an assumption that all the N PRBs are used. As one UE can occupy more PRBs at the same time, in one candidate aggregate allocation the values of k can be identical for different potential allocations.

The set of the candidate aggregate allocations is produced by the scheduler on the basis of the transmission priorities of the packets in the queues. The way to generate the set of the candidate aggregate allocations depends on the scheduling policy and is not the specific object of this invention.

Moreover, again as shown in the attached FIGURE, the scheduling method 10 further comprises:
- a score computation (block 13), which, in turn, comprises computing for each candidate aggregate allocation corresponding scores of the potential allocations in the candidate aggregate allocation; and
- a best total score aggregate allocation choice (block 14), which, in turn, comprises computing for each candidate aggregate allocation a corresponding total score that is a sum of the corresponding scores, and choosing the candidate aggregate allocation with the best, i.e., the highest, total score.

Using a mathematical notation, a candidate aggregate $\Gamma_{\tilde{q}}$ allocation is chosen as the best total score aggregate allocation so that:

$$\tilde{q} = \underset{q}{\mathrm{argmax}} \sum_{m=1}^{N} \Omega(m, k), (m, k, b) \in \Gamma_q \quad (10)$$

where the pairs (m,k) coincide with the pairs of the corresponding candidate aggregate allocation.

Furthermore, the scheduling method 10 also comprises:
- a QoS requirement check (block 15), which, in turn, comprises checking whether the chosen best total score aggregate allocation allows to fulfil QoS requirements of the services requested by the UEs.

In particular, if the QoS requirements are not fulfilled, then, as indicated in attached FIGURE by a first solid arrow NOK, the scheduling method 10 is again implemented starting from the candidate aggregate allocation generation (block 12), i.e., generating a new, different set of candidate aggregate allocations.

Alternatively, if the QoS requirements are not fulfilled, the scheduling method 10 may be again implemented starting from the QoS-aware packet queueing (block 11), as indicated in the attached FIGURE by a dashed arrow.

Otherwise, i.e., if the QoS requirements are fulfilled, condition represented in the attached FIGURE by a second solid arrow OK, the scheduling method 10 finally comprises:
- a resource allocation (block 16), which, in turn, comprises allocating the PRBs to respective UEs according to the chosen best total score aggregate allocation fulfilling the QoS requirements.

As previously said, the scheduling method 10 is implemented every TTI.

Additionally, a further aspect of the present invention allows to solve a further issue related to potential oscillating and/or deadlock situations which may occur in heavily loaded networks that have a substantially symmetric view of the transmission resources, i.e., the PRBs.

In particular, according to said further aspect of the present invention, for the i-th e-Node B in the score computation (block 13) a random factor $\chi_i$, that multiplies the negative element of the score, is introduced.

For example, starting from the definition (8'), a new definition of the score according to said further aspect of the present invention is:

$$\Omega(m, k) = \beta \cdot C(m, k) - \chi_i \cdot \mu \cdot \sum_{l \in \Phi} \phi_m(K_{ij}^l). \quad (11)$$

Preferably, during network tuning the random factor $\chi_i$ may be kept equal to one, while during normal operation it may be varied slowly and randomly within the interval $[1-\epsilon, 1+\epsilon]$, with $0<\epsilon<1$.

The score according to the definition (11) helps to solve the deadlock and oscillating situations in heavily loaded networks.

In fact, the random factor $\chi_i$ makes the i-th e-Node B become slightly more or slightly less "aggressive" (as opposed to "altruistic") in trying to schedule resources that are critical from the point of view of mutual inter-cell interference. The randomness given to the process would help to solve conflicts and disrupt oscillations.

Conveniently, the negative element of the score as defined in (8') may be computed as follows:

$$\sum_{l \in \Phi} \phi_m(K_{ij}^l) = \sum_{j=1}^{Q} w \cdot RNTP_{jm} \quad (12)$$

where:
- $RNTP_{jm}$ is the (j,m) element of the indicator bitmap for the m-th PRB received from the j-th e-Node B, and indicates whether the j-th e-Node B exceeds the Relative Narrowband Transmitted Power (RNTP) threshold associated to the (j,m) element (this mechanism being specified in 3GPP TSs 36.213 and 36.423); and w is a weighing factor depending on the pathloss between the j-th e-Node B and the k-th UE, that is the UE for which is computed the score.

In particular, if w=1, the interference is estimated only by counting the number of e-Node Bs exceeding a given power threshold.

Conveniently, a more accurate computation of the negative element of the score as defined in (8') may be based on both push and pull messages.

In particular, the negative element of the score as defined in (8') may be computed more accurately as follows:

$$\sum_{l \in \Phi} \phi_m(K_{ij}^l) = \sum_{j=1}^{Q} w \cdot RNTP_{jm} + \sum_{u=1}^{P} \vartheta \cdot \mathcal{R}_{um}$$

where $\mathcal{R}_{um}$ is sent in a pull message to the i-th e-Node B from the u-th e-Node B, which is interfered by the i-th e-Node B on the m-th PRB, with the purpose of requesting to lower transmission power of the i-th e-Node B on the m-th PRB, P is the number of interfered e-Node Bs and θ is a normalization factor.

$\mathcal{R}_{um}$ may be coded with a three-level value depending on the level of interference received from the i-th interfering e-Node B, each value of $\mathcal{R}_{um}$-corresponding to, respectively, a low, medium or high interference situation. When deriving the value $\mathcal{R}_{um}$, the sending u-th e-Node B may use UE pathloss measurements to determine the most interfering e-Node Bs.

With this approach the e-Node B receiving both RNTP and $\mathcal{R}$ may balance between a "selfish" behaviour with an "altruistic" behaviour with a suitable weighting of the two terms.

The advantages of the present invention are clear from the foregoing.

Finally, it is clear that numerous modifications and variants can be made to the present invention, all falling within the scope of the invention, as defined in the appended claims.

In particular, it may be appreciated that the present invention may also be theoretically applied to any wireless multi-carrier communication network.

The invention claimed is:

1. An interference coordination method for implementing coordination of intra-system interference experienced in a radio communication system including a plurality of user equipment configured to communicate on radio resources with transceiver stations, comprising:
   receiving, by a transceiver station having a transceiver, periodic messages from the plurality of user equipment served by the transceiver station, wherein the periodic messages include indicators of a channel quality of respective channels between the plurality of user equipment and the transceiver station;
   receiving by the transceiver station at least one coordination message from other transceiver stations indicating a potential allocation by the other transceiver stations of an interfered radio resource; and
   determining, for each user equipment of the plurality of user equipment served by the transceiver station, a score of the potential allocation of the interfered radio resource to a respective user equipment based on the periodic messages received from the plurality of user equipment and the at least one coordination message received from the other transceiver stations.

2. The interference coordination method according to claim 1, wherein the determining of the score of the potential allocation of the interfered radio resource to the respective user equipment further comprises:
   determining, based on the potential allocation, a first quantity indicative of a transmission capacity of the respective user equipment served by the transceiver station; and
   determining the score further based on the first quantity.

3. The interference coordination method according to claim 2, wherein the determining of the score of the potential allocation of the interfered radio resource to the respective user equipment further comprises:
   determining a second quantity indicative of a transmission quality experienced by the respective user equipment on the interfered radio resource; and
   determining the first quantity based on the second quantity.

4. The interference coordination method according to claim 1, further comprising:
   transmitting, from the transceiver station to an interfered transceiver station of the other transceiver stations, a push coordination message informing the interfered transceiver station that the transceiver station intends to transmit a given interference power on the interfered radio resource, when the transceiver station is an interfering transceiver station.

5. The interference coordination method according to claim 4, wherein the transmitting of the push coordination message further comprises:
   transmitting the push coordination message based on one of the other transceiver stations intending to increase transmission power on the interfered radio resource and the transceiver station intending to start transmitting on the interfered radio resource.

6. The interference coordination method according to claim 4, further comprising:
   receiving, by the transceiver station, a pull coordination message transmitted by the interfered transceiver station, the pull coordination message requesting the interfering transceiver station to lower transmission power transmitted on the interfered radio resource, and
   determining by the transceiver station the score based on the pull coordination message.

7. The interference coordination method according to claim 6, wherein
   the pull coordination message includes a value quantifying the interference experienced by the interfered transceiver station on the radio resource, and
   the method further comprises determining by the transceiver station the score based on the value.

8. The interference coordination method according to claim 7, wherein the determining of the score of the potential allocation of the interfered radio resource to the respective user equipment further comprises:
   weighing the score of the potential allocation by a time-varying random factor.

9. The interference coordination method according to claim 1, further comprising:
   generating, for the transceiver station, a set of candidate aggregate allocations, each candidate aggregate allocation including corresponding potential allocations of radio resources to the served plurality of user equipment;

computing a total score of each candidate aggregate allocation based on the scores of the corresponding potential allocations of the interfered radio resource; and allocating radio resources to the served plurality of user equipment based on total scores of the candidate aggregate allocations.

10. The interference coordination method according to claim 9, wherein the total score of each candidate aggregate allocation is computed as a sum of the scores of the corresponding potential allocations.

11. The interference coordination method according to claim 9, wherein the allocating of radio resources to the served plurality of user equipment further comprises:

allocating radio resources to the served plurality of user equipment according to the candidate aggregate allocation having a highest total score.

12. A non-transitory computer-readable medium having stored thereon a program that, when executed by a radio transceiver station having a transceiver, causes the transceiver station to execute a method comprising:

receiving periodic messages from a plurality of user equipment served by the transceiver station, wherein the periodic messages include indicators of a channel quality of respective channels between the plurality of user equipment and the transceiver station;

receiving at least one coordination message from other transceiver stations indicating a potential allocation by the other transceiver stations an interfered radio resource; and determining, for each user equipment of the plurality of user equipment served by the transceiver station, a score of the potential allocation of the interfered radio resource to a respective user equipment based on the periodic messages received from the plurality of user equipment and the at least one coordination message received from the other transceiver stations.

13. The non-transitory computer readable medium of claim 12, wherein the determining of the score of the potential allocation of the interfered radio resource to the respective user equipment further comprises:

determining, based on the potential allocation, a first quantity indicative of a transmission capacity of the respective user equipment served by the transceiver station; and determining the score further based on the first quantity.

14. The non-transitory computer readable medium of claim 13, wherein the determining of the score of the potential allocation of the interfered radio resource to the respective user equipment further comprises:

determining a second quantity indicative of a transmission quality experienced by the respective user equipment on the interfered radio resource; and determining the first quantity based on the second quantity.

15. The non-transitory computer readable medium of claim 12, wherein the method further includes:

generating, for the transceiver station, a set of candidate aggregate allocations, each candidate aggregate allocation including corresponding potential allocations of radio resources to the served plurality of user equipment;

computing a total score of each candidate aggregate allocation based on the scores of the respective potential allocation of the interfered radio resource; and allocating radio resources to the served plurality of user equipment based on total scores of the candidate aggregate allocations.

16. A transceiver station comprising:

circuitry configured to receive periodic messages from a plurality of user equipment served by the transceiver station, wherein the periodic messages include indicators of a channel quality of respective channels between the plurality of user equipment and the transceiver station;

receive at least one coordination message from other transceiver stations indicating a potential allocation by the other transceiver stations of an interfered radio resource; and determine, for each user equipment of the plurality of user equipment served by the transceiver station, a score of the potential allocation of the interfered radio resource to a respective user equipment based on the periodic messages received from the plurality of user equipment and the at least one coordination message received from the other transceiver stations.

17. The transceiver station of claim 16, wherein the circuitry is further configured to:

determine, based on the potential allocation, a first quantity indicative of a transmission capacity of the respective user equipment served by the transceiver station; and determine the score further based on the first quantity.

18. The transceiver station of claim 17, wherein the circuitry is further configured to:

determine a second quantity indicative of a transmission quality experienced by the plurality of user equipment on the interfered radio resource; and determine the first quantity based on the second quantity.

19. The transceiver station of claim 16, wherein the circuitry is further configured to:

generate a set of candidate aggregate allocations, each candidate aggregate allocation including corresponding potential allocations of radio resources to the served plurality of user equipment;

compute a total score of each candidate aggregate allocation based on the scores of the corresponding potential allocations; and allocate radio resources to the served plurality of user equipment based on total scores of the candidate aggregate allocations.

20. The transceiver station of claim 16, wherein the circuitry is further configured to:

weigh the score of the potential allocation by a time-varying said interference power and/or said value by a random factor.

21. The interference coordination method according to claim 1, wherein the periodic messages received from the plurality of user equipment include channel quality indicators for respective channels between each user equipment of the plurality of user equipment and the transceiver station, and the at least one coordination message received from the other transceiver stations represents the potential allocation using ratios of future transmitted power over channels of the other transceiver stations relative to current transmitted power over the channels of the other transceiver stations.

22. The interference coordination method according to claim 2, wherein the first quantity is a transmission capacity corresponding to the potential allocation of the interfered radio resource.

23. The interference coordination method according to claim 3, wherein the second quantity is a signal-to-noise-plus-interference ratio corresponding to a channel between the respective user equipment and the transceiver station.

* * * * *